R. A. CAMPBELL.
TIRE STEM COVER.
APPLICATION FILED DEC. 30, 1914.
1,146,774.
Patented July 13, 1915.
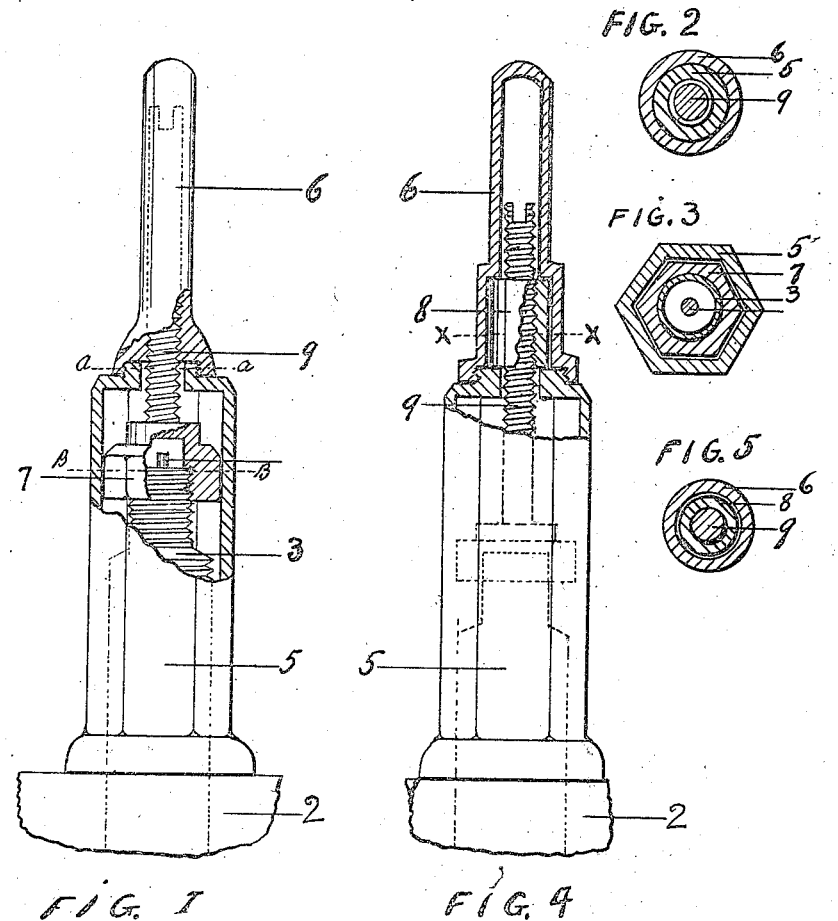
WITNESSES
INVENTOR
ROBERT A. CAMPBELL.
PER Walter A. Campbell
ATTORNEY.

UNITED STATES PATENT OFFICE.

ROBERT A. CAMPBELL, OF MINNEAPOLIS, MINNESOTA.

TIRE-STEM COVER.

1,146,774.　　　Specification of Letters Patent.　　Patented July 13, 1915.

Application filed December 30, 1914. Serial No. 879,730.

*To all whom it may concern:*

Be it known that I, ROBERT A. CAMPBELL, a citizen of the United States, resident of Minneapolis, county of Hennepin, State of Minnesota, have invented certain new and useful Improvements in Tire-Stem Covers, of which the following is a specification.

The object of my invention is to provide an attachment for a pneumatic tire stem, which will enable the user to easily and quickly uncover the end of the tire stem for ascertaining the air pressure within the tire with a gage, or for increasing such pressure, or to change the inner tube, and as easily and quickly recover the tire stem.

A further object is to provide a stem cap to make an air-tight joint with the end of the tire stem and a dust cover to slip over said cap to protect the rest of the exposed portion of the tire stem from dust and moisture, and means for holding the cap in the cover at any desired place, and means for applying or removing cap and cover, by means of the cover, as one piece.

A further object is to provide a well finished, complete instrument that can be adjusted to fit any tire stem, and that can perform the function of a cap, dust cover, and rim nut.

Other objects of the invention will appear from the following detailed description.

The invention consists generally in various constructions and combinations, all as hereinafter described and particularly pointed out in the claims.

In the accompanying drawings forming part of this specification, Figure 1 is a detailed sectional view of a tire stem and cover therefor. Fig. 2 is a cross section on *a—a* of Fig. 1. Fig. 3 is a cross section on *b—b* of Fig. 1. Fig. 4 is a detailed sectional view of a modification of the means for retaining cap 7 in cover 5. Fig. 5 is a cross section on *x—x* of Fig. 4.

In the drawings, 2 represents the wheel rim and 3 a tire stem exteriorly threaded as usual in stems of this kind. A cap 7, having an exterior surface polygonal in cross section, and an exteriorly threaded extension 9, is interiorly threaded to engage the threads on the tire stem, and is provided with an interior shoulder and gasket for making an air-tight joint with the end of the tire stem. Slidable longitudinally upon the external surface of cap 7 is a dust cover 5 having an inner surface of which the cross section is a polygon similar to that of the cross section of the outer surface of cap 7. At the upper end of the dust cover 5 is an opening for the passage of the extension 9 and threads for the reception of threads on extension cover 6.

In Fig. 1 extension cover 6 is interiorly threaded to engage the threads on extension 9, and also threaded to engage the threads on the upper end of dust cover 5. Extension cover 6 when screwed into place is designed to retain cap 7 at the desired position within dust cover 5.

In Fig. 4 nut 8 is interiorly threaded to fit the threads of extension 9 and has a bearing on the upper end of dust cover 5; extension cover 6 is threaded only to fit the threads on the upper end of dust cover 5, and has an internal shoulder to bear upon the upper end of nut 8. Nut 8 is designed to force dust cover 5 to make a bearing on the wheel rim when cap 7 is in position on the tire stem. Extension cover 6 when in place retains nut 8 in place thereby retaining stem cap 7 in dust cover 5 at the desired position at all times. When the device is in position on the tire stem, dust cover 5 which carries an elastic packing at its lower end has a bearing on the wheel rim. In this way a covering is made for the portion of the tire stem that projects through the wheel rim, dust and moisture proof, and the end of the stem is covered air tight.

Various forms, modifications and adaptations of this design may be made, and come within the scope of the invention.

The utility of the invention consists in the saving in time and labor in uncovering and recovering the tire stem for testing tire pressure, in inflating, and in changing tubes.

I claim as my invention:

1. The combination, with a tire stem, of a tire stem cap, and a dust cover having a bearing on said tire stem cap, the intersection of said bearing surface of said dust cover by a horizontal plane being a polygon, the intersection of said bearing surface of said tire stem cap by a horizontal plane being a polygon similar to said polygon of said bearing surface of said dust cover.

2. The combination, wit' a tire stem, of a tire stem cap, a dust cover .ving a bearing on said tire stem cap, the intersection of said bearing surface of said dust cover by a horizontal plane being a polygon, the intersection of said bearing surface of said tire stem cap by a horizontal plane being a polygon similar to said polygon of said bearing surface of said dust cover, and means for normally retaining said tire stem cap at a desired position relative to said dust cover.

3. The combination, with a tire stem, of a tire stem cap, a dust cover having a bearing on said tire stem cap, the intersection of said bearing surface of said dust cover by a horizontal plane being a polygon, the intersection of said bearing surface of said tire stem cap by a horizontal plane being a polygon similar to said polygon of said bearing surface of said dust cover, means for normally retaining said tire stem cap at a desired position relative to said dust cover, and means for adjusting said dust cover to a desired position on said tire stem cap.

4. The combination, with a tire stem, of a dust cover, a tire stem cap having an extension, and a casing for said extension.

5. The combination, with a tire stem, of a dust cover, a tire stem cap having an extension, a casing for said extension, and means for adjusting said dust cover to a desired position on said tire stem cap.

6. The combination, with a tire stem, of a dust cover, a tire stem cap having an extension, a casing for said extension, means for adjusting said dust cover to a desired position on said tire stem cap, and means for turning said tire stem cap with said dust cover.

7. The combination with a tire stem, of a dust cover, a tire stem cap within said dust cover, said tire stem cap having an exteriorly threaded extension, and a cover for said extension having a bearing on said dust cover.

8. The combination with a tire stem, of a dust cover, a tire stem cap within said dust cover, said tire stem cap having an exteriorly threaded extension, a cover for said extension having a bearing on said dust cover, and means for adjusting said dust cover to a desired position on said tire stem cap.

9. The combination, with a tire stem, of a dust cover, a tire stem cap having an exteriorly threaded reduced extension designed to pass through an opening in the upper end of said dust cover, and a cover for said extension internally threaded to engage the threads of said reduced extension, said cover for said extension also having a threaded connection with said dust cover and normally closing the opening in the upper end of said dust cover.

10. The combination, with a tire stem, of a dust cover, a tire stem cap having an exteriorly threaded reduced extension designed to pass through an opening in the upper end of said dust cover, a cover for said extension internally threaded to engage the threads of said reduced extension, said cover for said extension also having a threaded connection with said dust cover and normally closing the opening in the upper end of said dust cover, and means for turning said cap with said dust cover.

11. The combination, with a tire stem, of a dust cover, a tire stem cap having an exteriorly threaded reduced extension normally passing through an opening in the upper end of said dust cover, a nut on said extension having a bearing on said dust cover, and a cover for said extension having a bearing on said nut, said cover for said extension having a threaded connection with said dust cover, and normally closing the opening in the upper end of said dust cover.

12. The combination, with a tire stem, of a dust cover, a tire stem cap having an exteriorly threaded reduced extension normally passing through an opening in the upper end of said dust cover, a nut on said extension having a bearing on said dust cover, a cover for said extension having a bearing on said nut, said cover for said extension having a threaded connection with said dust cover, and normally closing the opening in the upper end of said dust cover, and means for turning said cap with said dust cover.

13. The combination with a tire stem; of a tire stem cap having an extension, a dust cover having an opening in its upper end, a cover for said extension normally closing said opening and means for forcing said dust cover to make a bearing on the wheel rim.

14. The combination with a tire stem, of a tire stem cap having an extension, a dust cover having an opening in its upper end, a cover for said extension normally closing said opening, means for forcing said dust cover to make a bearing on the wheel rim, and means for turning said cap with said dust cover.

15. The combination with a tire stem, of two members, one of said members having a longitudinal groove or grooves, the other of said members having means projecting into said groove or grooves, said means and said groove or grooves being designed to permit longitudinal movement of one of said members upon the other of said members, and to prevent rotary movement of one of said members independent of rotary movement of the other of said members, one of said members having means adapted to cover the end of the tire stem, the other of said members being adapted to cover the remaining exposed portion of the tire stem.

16. The combination with a tire stem, of a member having means to cover the end of the tire stem, a member designed to act as a dust guard, one of said members having longitudinally slidable connection with the other of said members, and means for preventing rotary movement of one of said members independent of like rotary movement of the other of said members.

ROBERT A. CAMPBELL.

Witnesses:
W. W. CAMPBELL,
S. W. NEWTON.